United States Patent [19]

Quigley et al.

[11] Patent Number: 4,888,367

[45] Date of Patent: Dec. 19, 1989

[54] PROCESS FOR NEUTRALIZING CROSSLINKED POLY (ACRYLIC ACID)

[75] Inventors: Vincent P. Quigley; Richard J. Jorkasky, II, both of Maple Heights, Ohio

[73] Assignee: The Standard Oil Company, Cleveland, Ohio

[21] Appl. No.: 126,652

[22] Filed: Dec. 1, 1987

[51] Int. Cl.$^4$ ............................................. C08L 0/00
[52] U.S. Cl. ................................. 524/17; 524/108; 524/127; 524/156; 524/157; 524/158; 524/315; 524/356; 524/462; 524/464; 524/522
[58] Field of Search ................. 524/522, 17, 108, 127, 524/156, 157, 158, 315, 356, 462, 464

[56] References Cited

U.S. PATENT DOCUMENTS

| | | | |
|---|---|---|---|
| 2,552,775 | 5/1951 | Fischer et al. | 252/8.5 |
| 2,980,655 | 4/1961 | Glass et al. | 526/209 |
| 3,070,583 | 12/1962 | Uraneck et al. | 260/82.1 |
| 3,915,921 | 10/1975 | Schlatzer | 260/86.1 |
| 3,947,399 | 3/1976 | Sekmakas | 260/29.6 E |
| 4,330,293 | 5/1982 | Lindemann | 8/495 |
| 4,375,533 | 3/1983 | Park et al. | 526/193 |
| 4,401,795 | 8/1983 | Herman et al. | 525/327.8 |
| 4,404,309 | 9/1983 | Masler, III | 524/379 |
| 4,419,502 | 12/1983 | Sehm | 526/209 |
| 4,420,596 | 12/1983 | Lochhead et al. | 526/212 |
| 4,420,610 | 12/1983 | Sehm | 528/501 |
| 4,526,937 | 7/1985 | Hsu | 524/724 |
| 4,692,502 | 9/1987 | Uebele et al. | 526/193 |

OTHER PUBLICATIONS

BF Goodrich Company, "Textile Pigment Printing with Carbopol © Resins", Mar. 1984.

*Primary Examiner*—Joseph L. Schofer
*Assistant Examiner*—J. M. Reddick
*Attorney, Agent, or Firm*—D. P. Yusko; D. J. Untener; L. W. Evans

[57] ABSTRACT

High polymer content compositions, containing the neutralized salt of a carboxyl-containing polymer suspended in an organic medium, are made by neutralizing the carboxyl-containing polymer in the presence of a neutralizing agent and an equal quantity of already neutralized polymer in an organic medium. These compositions are useful as thickeners and emulsifiers for aqueous solutions.

19 Claims, No Drawings

PROCESS FOR NEUTRALIZING CROSSLINKED POLY (ACRYLIC ACID)

BACKGROUND OF THE INVENTION

1. Field of the Invention

This invention relates to carboxyl-containing polymers (such as polyacrylic acid) which when neutralized are useful as thickeners and emulsifiers for aqueous mixtures. More specifically, this invention relates to an improved process for neutralizing acrylic acid copolymers and crosslinked acrylic acid copolymers to yield a thickening agent comprising the polymer suspended in an organic solvent and characterized as containing a higher percentage of polymer solids than previously achieved for such thickening agents.

2. Description of the Prior Art

It is known that copolymers of carboxyl-containing monomers, such as acrylic acid and about 0.1 to 1.0 by weight of a crosslinking monomer, such as polyallyl sucrose, are gel-like polymers which are insoluble in water and organic solvents and which, especially in the form of their salts, absorb large quantities of water or solvent which causes the copolymer to increase many times in volume. These polymers, because of their swelling properties, are useful as bodying and suspending agents in various mucilaginous and colloidal gel-like applications such as dentifraces, surgical jellies, creams and ointments, printing paste thickeners, and the like.

It is the neutralized salt (most likely a partial alkali, ammonium or amine salt) of the copolymer which exhibits maximum thickening or emulsifying properties. Typically, the neutralized salt is prepared by combining a slurry of the copolymer and several surfactants in a solvent with a neutralizing agent such as ammonium hydroxide. The neutralizing reaction is highly exothermic. If the polymer content of the slurry to be neutralized is too great, removing heat from the neutralization reaction is difficult, and the polymer has a tendency to gel which makes it difficult to transfer the neutralized product from the reactor.

In its useable form, the neutralized polymer, in the presence of several surfactants is diluted by and is suspended in an organic solvent. Typically, such mixtures contain 20 to 35 wt percent of the polymer which is the maximum routinely achieveable without a runaway exothermic reaction or gelling during the neutralization. Further, these mixtures are very effective thickening agents when combined with aqueous solutions. For example, only a tablespoon of such mixtures is required to thicken several gallons of aqueous solutions. However, if the polymer content of the mixture could be increased, then even less of the thickening agent would be required to produce the same amount or degree of thickening.

An objective of the present invention is to develop a process for the neutralization of crosslinked copolymers of carboxyl-containing monomers and the production of thickening agents containing such polymers. This improved process which eliminates or controls the high reactor temperatures resulting from the exothermic neutralization reaction, produces no gelling of the copolymer, and results in a thickening agent having a high weight percent polymer solids.

SUMMARY OF THE INVENTION

A new process for the neutralization of crosslinked copolymers of carboxyl-containing monomers and preparing the production of thickening or emulsifying agents containing high weight percentages of such copolymers has been discovered. In its simplest embodiment, this process comprises neutralizing a slurry comprising a carboxyl-containing polymer in solvent by combining with mixing:

(1) the neutralized salt of a carboxyl-containing polymer in an organic medium,
(2) a neutralizing agent, and
(3) the slurry comprising a carboxyl-containing polymer in an organic medium.

In a second embodiment this process comprises combining with mixing (1) a surfactant having an HLB less than or equal to 10,
(2) the neutralized salt of a carboxyl containing copolymer in an organic medium,
(3) a neutralizing agent,
(4) a slurry comprising a carboxyl containing polymer in an organic medium; and
(5) a surfactant having an HLB greater than 10, and an anionic surfactant wherein the above ingredients are combined in the sequence shown.

The above process produces a thickening or emulsifying agent containing carboxyl containing polymer in excess of 30 weight percent.

DETAILED DESCRIPTION OF THE INVENTION

According to the present invention, compositions, useful as thickening agents and emulsifiers and commonly referred to as "concentrates" are made with concentrations of greater than 30 weight percent of carboxyl containing polymers solids suspended in an organic medium. Essentially, such high polymer content "concentrates" are made by neutralizing the polymer in the presence of a neutralizing agent and an already neutralized polymer in a non-polar organic medium.

The Carboxyl-Containing Polymers

The carboxyl containing polymers are prepared from vinylidene monomers containing at least one terminal $CH_2=C<$ group. These monomers may be homopolymerized or copolymerized with unsaturated, polymerizable carboxylic monomers such as acrylic acid, maleic acid, itaconic acid and the like. In addition these polymers or copolymers may include small amounts of crosslinking monomers. The carboxyl containing polymers have molecular weights greater than about 500 to several million, usually greater than about 10,000 to about 900,000 or more.

The carboxylic monomers useful in the production of the polymers of this invention are the olefinically unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl —C=C—COOH group; or as a part of a terminal methylene ($CH_2=C<$) grouping. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxyl-4-phenyl butadiene-1,3), itaconic acid, citraconic acid, mesaconic acid, glutaconic acid, aconitic acid, maleic acid, fumaric acid, and tricarboxyl ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure:

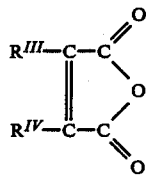

wherein $R^{III}$ and $R^{IV}$ are each independently selected from the group consisting of hydrogen; halogens; a cyano (—C≡N) group; and alkyl, aryl, alkyl/aryl and cycloalkyl groups, such as methyl, ethyl, propyl, octyl, decyl, phenyl, tolyl, xylyl, benzyl, cyclohexyl, and the like. As used herein and throughout this description, "alkyl/aryl" refers to organic groups having an aliphatic portion in conjunction with an aromatic portion.

The preferred carboxyl-containing monomers for use in this invention are the monoolefinic acrylic acids having the general structure.

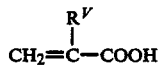

wherein $R^V$ is a substituent selected from the class consisting of hydrogen, a halogen, a cyano (—C≡N) group, monovalent alkyl groups, monovalent aryl groups, monovalent alkyl/aryl groups, and monovalent cycloaliphatic groups. Of this class, acrylic and methacrylic acid are most preferred because of generally lower cost, ready availability and ability to form superior polymers.

The polymers contemplated include both homopolymeric carboxylic acids or anhydrides thereof, or the defined carboxylic acids copolymerized with one or more other vinyl or vinylidene monomers containing at least one terminal $CH_2=C<$ group. Such materials include, for example, acrylic ester monomers including those acrylic ester monomers having long chain aliphatic groups such as derivatives of an acrylic acid represented by the formula.

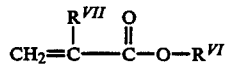

wherein $R^{VI}$ is an alkyl, aryl, or alkyl/aryl group having from 10 to 30 carbon atoms, preferably 10 to 20 carbon atoms and $R^{VII}$ is hydrogen or a methyl or ethyl group, present in the copolymer in amount, for example, from about 1 to 30 weight percent, and for some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are those methacrylates where the alkyl group contains 16 to 21 carbon atoms.

Other acrylic esters contemplated are also derivatives of an acrylic acid used in amounts, for example, up to about 30 weight percent represented by the formula

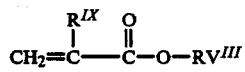

wherein $R^{VIII}$ is an alkyl, alkoxy, haloalkyl, cyanoalkyl, and like groups having from 1 to 9 carbon atoms and $R^{IX}$ is hydrogen or a methyl or ethyl group. These acrylic esters are present in the copolymer for some uses in amounts up to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like. Mixtures of these two classes of acrylates provide useful copolymers.

Other vinyl or vinylidene monomers, such as the α,β-olefinically unsaturated nitriles may also be used, particularly in conjunction with acrylic esters. The α,β-olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used, for example, for some polymers are up to about 30 weight percent of the total monomers copolymerized.

Acrylic amides include monoolefinically unsaturated amides that may be incorporated in the interpolymers of this invention having at least one hydrogen on the amide nitrogen and the olefinic unsaturation is alphabeta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Representative of other acrylic amides are N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleamide, N-methylol maleamic acid, N-methylol maleamic acid esters, the N-alkylol amides of the vinyl aromatic acids such as N-methylol-p-vinyl benzamide, and the like. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

Other vinyl or vinylidene comonomers generally include in addition to those described above, at least one other olefinically unsaturated monomer, more preferably at least one other vinyl or vinylidene monomer copolymerized therewith, for example up to about 30% or more by weight of the total monomers. Suitable monomers include α-olefins containing from 2 to 12 carbon atoms, more preferably from 2 to 8 carbon atoms; dienes containing from 4 to 10 carbon atoms including butadiene; vinyl esters and allyl esters such as vinyl acetate, vinyl aromatics such as styrene; vinyl and allyl ethers and ketones such as vinyl methyl ether and methyl vinyl ketone; cyanoalkyl acrylates such as methyl α-cyano acrylate, the propyl α-, β- and α-cyano acrylates, vinyl halides and vinyl chloride, vinylidene chloride and the like; esters of maleic and fumaric acid and the like.

Optionally, the polymers may be cross-linked with any polyfunctional vinyl or vinylidene monomer containing at least 2 terminal $CH_2=CH<$ groups, including for example, butadiene, isoprene, divinyl benzene, divinyl naphthlene, allyl acrylates and the like. Particularly useful cross-linking monomers are polyalkenyl polyethers having more than one alkenyl ether grouping per molecule. The most useful crosslinkers possess alkenyl groups in which an olefinic double bond is attached to a terminal methylene $CH_2=C<$ groups. These are made by the esterification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of either groupings on each molecule. Efficiency of the polyether cross-linking agent increases with the number of potentially polymerizable groups on the molecule. It is preferred to utilize polyethers containing an average of two or more alkenyl ether groupings per molecule. Representative of other crosslinking monomers are diallyl esters, diallyl ethers, allyl acrylates, methacrylates and acrylamides, and methacrylamides, tetraallyl tin, tetravinyl silane, polyalkenyl methanes, diacrylates, and dimethacrylates, divinyl compounds such as divinyl benzene, polyallyl phosphate, diallyloxy compounds, diallyloxy phosphite esters and the like. Preferred crosslinking agents are triallyl pentaerythritol, trimethylolpropane triacrylate, 1,6-hexanediol diacrylate, trimethylolpropane diallyl ether, pentaerythritol triacrylate, tetramethylene dimethacrylate, tetramethylene diacrylate, ethylene diacrylate, ethylene dimethacrylate, triethylene glycol dimethacrylate, and the like.

When the optional cross-linking agent is present, the polymeric mixtures usually contain up to about 5% by weight of cross-linking monomer based on the amount of the carboxylic acid monomer and other monomers, if present. More preferably the mixture contains about 0.1 to about 2.0 weight percent of crosslinker.

The polymerizations are normally conducted in an organic media having some solubilizing effect on one or more of the monomeric ingredients, but substantially none of the resulting polymers. In other words, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate.

Typical solvents include hydrocarbon containing 6 to 40 carbon atoms, benzene, xylene, tetralin, hexane, heptane, cyclohexane, mineral spirits and mineral oils; halocarbons such as carbon tetrachloride, chloroform, trichloroethylene, methyl chloride, ethyl chloride and methylene chloride; chlorofluoroalkanes such as chlorofluoromethane and chlorofluoroethane containing at least four halogen atoms; esters such as methyl acetate, ethyl acetate and butyl propionate; ketones such as methylethylketone, acetone, and dioxane.

The amount of organic medium used may vary from at least 1 weight percent of monomers and 99 weight percent organic medium up to about 75 weight percent monomers and 25 weight percent organic medium, more normally a concentration of about 10 to 50 weight percent monomers is employed. Excellent results have been obtained with mineral spirits having a flash point greater than 120° F. and containing 0 to 2% aromatics; 40 to 85% paraffins and 15 to 50% naphthenes.

Polymerization of the monomers in the organic medium is usually carried out in the presence of a free radical catalyst in a closed vessel in an inert atmosphere under autogenous pressure or artificially-induced pressure, or in an open vessel under reflux at atmospheric pressure. Temperature of the polymerization may be varied from about 0° to 100° C., depending to a degree on the molecular weight desired in the polymer. Polymerization at 25° to 90° C. under autogenous pressure using a free radical catalyst is generally effective in producing polymer yields of 75% to 100%. Preferably, the polymerization temperature is between 40° and 80° C.

Polymerization of the monomers is carried out in the presence of a free radical catalyst. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like, as well as azo catalysts and azobisisobutyryl nitrile, hereinafter referred to as aziisobutyronitrile. Other catalysts utilizable are the so-called "redox" type of catalyst and the heavy-metal activated catalyst systems. Ultra-violet light and high energy radiation may also be used as a source of free radicals.

Polymerization of the monomers may be conducted in reactors which are either batch, semi-batch or continuous. The reactors should be equipped with a means to provide agitation sufficient to maintain the slurry and obtain effective heat transfer, for example, helical agitators, pitched turbines and the like. The monomer may be batch charged or continuously added during the course of polymerization or by any other manner of polymerization techniques conventionally used. Where monomer is continuously added during the course of polymerization, typically up to 40 wt percent of the monomer is initially present in the reactor with the remaining monomer added during the course of polymerization. Normally polymerization time is from about 2 to 12 hours.

A surfactant is added to the polymerization mixture in order to enhance emulsion stability. Any surfactant which does not adversely affect the polymer composition is suitable for this purpose. Examples of suitable surfactants are taught in U.S. Pat. No. 4,375,533 and U.S. Pat. No. 4,692,502. The amount of surfactant employed may be as low as 0.01 weight percent and as high as 40.0 weight percent, based on the weight of monomer or monomers to be polymerized. Usually the amount of surfactant employed will be in the range of about 0.5% to about 20% by weight. Preferably, an amount of the surfactant in the range of 1.0 to 10.0 by weight is employed.

Neutralization Step

A slurry of carboxyl containing polymers in the organic media is neutralized in the presence of already neutralized carboxyl containing polymers to yield a high polymer content thickening agent. While not intending to be bound by theory, it is theorized that the presence of the already neutralized polymer acts as a diluent for the unneutralized polymer and as a "heat sink" during the highly exothermic neutralization reaction. This enables slurries containing in excess of 30 wt percent unneutralized polymer to be neutralized in a controlled exothermic reaction and without gelling of the polymer. The procedure results in thickening agents comprising higher percentages of neutralized polymer.

The neutralization procedure comprises combining the following ingredients with mixing in the order shown below:

(1) at least one surfactant having an HLB less than or equal to 10,
(2) the neutralized salt of a carboxyl containing polymer in solvent,
(3) a neutralizing agent,
(4) a slurry comprising carboxyl containing polymers in an organic medium, and
(5) at least one surfactant having an HLB greater than 10 and at least one anionic surfactant.

The slurry comprising the carboxyl-containing polymers in an organic medium is typically the product of the polymerization reaction. However, the slurry can also be prepared by combining dry or powdered carboxyl-containing polymers with an organic medium (e.g. mineral spirits) and one or more suitable surfactants. As used herein, a "slurry comprising carboxyl-containing polymers" describes a mixture containing carboxyl-containing polymers which have not been neutralized. The slurry contains up to 60 wt percent unneutralized carboxyl containing polymer with up to 10 wt percent surfactants in the organic medium. A typical slurry composition is about 50 wt percent polymer, 45 wt percent organic solvent and 5 wt percent surfactants. As used herein "organic medium" describes a solution comprising one or more organic solvents. Representative organic solvents are described in the "Carboxyl Containing Polymers" section of this description.

The neutralized salt of the carboxyl-containing polymer is suspended in a blend of organic and aqueous solvent. This mixture comprises up to 45 weight percent of the neutralized salt of the polymer, 20 to 40 weight percent organic solvent, 20 to 30 weight percent water, 1 to 10 weight percent of an anionic surfactant, 0.5 to 5 weight percent of a surfactant having an HLB less than 10, and 0.5 to 5 weight percent of surfactant having an HLB greater than 10. This mixture is the result of the neutralization process described herein or can be achieved by the prior art methods for neutralizing the carboxyl containing polymer (as illustrated in Example II herein). Typically, the prior art method produces a neutralized salt of carboxyl-containing polymer in solvent having less than 25 weight percent polymer solids.

Any suitable organic or inorganic base, which does not adversely affect the polymer composition, may be used as the neutralizing agent. Representative compounds include (i) hydroxides, such as sodium hydroxide, potassium hydroxide, lithium hydroxide and ammonium hydroxide; (ii) ammonia; (iii) carbonates, such as sodium carbonate, potassium carbonate, lithium carbonate or ammonium carbonate; (iv) bicarbonates, such as sodium bicarbonate, potassium bicarbonate, lithium bicarbonate and ammonium bicarbonate; and (v) organic amines, such as ethanolamine, diethanolamine, triethanolamine, diethyl amine, dimethyl amine, trimethyl amine, triethyl amine, tributyl amine and so forth. The most preferred neutralizing agent is ammonium hydroxide. Typically, excess neutralizing agent is employed (i.e. more base than is stoichiometrically necessary to fully neutralize the polymer) in the neutralization procedure.

In the practice of the invention, any of the general types of surface active agents or surfactants typically may be employed. The surfactants' emulsifying efficiency is related to the polarity of the molecule, that is, the relation between the contribution of the polar hydrophilic head and the non-polar lipophilic tail. This polarity for nonionic surfactants is defined in terms of an empirical quantity which is called the "hydrophile-lipophile balance" or "HLB". The HLB is explained and the method of determining the same is set out in "Nonionic Surfactants" edited by Martin J. Shick at page 604–612, published in 1967 by Marcel Dekker, Inc., NY. The concept of hydrophile-lipophile balance is typically used in the context of nonionic surfactants. However, the neutralization step should not be limited to nonionic surfactants in that several species of ionic surfactants are also suitable.

Representative of the nonionic surfactants useful for the purposes of the invention are those falling within the following generic classes and having an HLB in the broad ranges given above: (1) polyoxyethylene alkylphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol esters; and (7) polyalkylene oxide block copolymers. As examples of surfactants in the above classes having the appropriate HLB there may be named the following: sorbitan trioleate; sorbitan tristearate; polyoxyethylene sorbitol hexastearate; lactylated mono- and diglycerides of fat-forming fatty acids, ethylene glycol fatty acid ester; mono- and diglycerides from the glycerolysis of edible fats; propylene glycol fatty acid ester; propylene glycol monostearate; sorbitan sesquioleate; polyoxyethylene sorbital 4.5 oleate; glycerol monostearate; decaglyceryl tetraoleate triglyceryl monooleate; sorbitan monooleate; sorbitan monolaurate; sorbitan partial fatty esters; high-molecular weight fatty amine blend; sorbitan monostearate; diethylene glycol fatty acid ester; polyoxyethylene (2) stearyl ethyl; polyoxyethylene (2) oleyl ether; polyoxyethylene sorbitol beeswax derivative; polyoxyethylene (2) cetyl ether; diethylene glycol monolaurate (soapfree); sorbitan monopalmite; high-molecular weight amine blend; sorbitan monooleate polyoxyethylene ether mixed fatty and resin acids blend; polyoxypropylene mannitol dioleate; polyoxyethylene sorbitol lanolin derivative; sorbitan monolaurate; polyoxyethylene sorbitol esters of mixed fatty and resin acids; polyoxyethylene fatty acid; polyoxyethylene sorbitol oleate; polyoxyethylene sorbitan monostearate; polyoxyethylene sorbitol tallow esters; polyoxyethylene sorbitol tall oil; polyoxyethylene lauryl ether; polyoxyethylene sorbitan monooleate; polyoxyethylene sorbitol hexaoleate; polyoxyethylene sorbitan tristearate; and polyoxyethylene sorbitan trioleate.

Surfactants having an HLB less than 10 are typically added in quantities of 0.1 to 5.0 wt percent; and preferably about 1.5 wt percent. Preferred surfactants having an HLB less than 10 are those surfactants having an HLB between 1.0 and 6.0. Examples of preferred surfactants include sorbitan monooleate (HLB=4.3), sorbitan sesquioleate (HLB=3.7) and glycerol monooleate (HLB=2.7).

Surfactants having an HLB greater than 10 are typically added in quantities of 0.1 to 5.0 wt percent; and preferably about 1.0 wt percent. Preferred surfactants having an HLB greater than 10, generally have an HLB between 12 and 20, such as polyoxyethylene (20) sorbitan monooleate (HLB=15) and nonylphenoxypoly(ethylenoxy)ethanol (HLB=13).

The anionic surfactants used in the neutralization process are various carboxylates, sulfonates, phosphates and phosphinates. Representative anionic surface active agents include carboxylates of the general structure RCOO-M+, wherein R may be an alkyl group, aryl group, alkyl/aryl group, as well as a halogenated and substituted alkyl, aryl or alkyl/aryl group and R is further defined as containing eight or more hydrocarbons, and M+ may be H+ or any monovalent or multivalent metal or ammonium cation, such as $Na^+$, $K^+$, $Li^+$, $MG^{+2}$, $Ca^{+2}$, $Sr^{+2}$, $Ba^{+2}$, $Fe^{+3}$, $Al^{+3}$, $NH_4^+$. Other representative anionic surfactant active agents include mono-, di- and tri-ethanolammonium; polyalkoxycarboxylates such as a sodium alkylphenol $(EtO)_8$ carboxylate; acrylated protein hydrolysates prepared by the acylation of protein hydroysates with fatty acids or acid chlorides; sulfonates, especially alkyl/aryl sulfonates such as Atlas G-3300 produced by ICI Americas Inc.; alkylbenzenesulfonates such as sodium dodecyl benzene sulfonate, triethanolamine dodecyl benzene sulfonate, or ammonium dodecyl benzene sulfonate; alkylarylsulfonates, such as the sodium and ammonium salts of toluene-, xylene-, and isopropyl-benzenesulfonic acid; lignosulfonates, such as the sugar free sodium based sulfonates of lignin such as Polyfon F, Polyfon H, Polyfon O and Polyfon T produced by Westvaco Chemicals Division; naphthalenesulfonates, such as sodium isopropyl napthalenesulfonate; α-olefinsulfonates, such as the sodium alpha-olefin $C_{14}$–$C_{16}$ sulfonates; dialkyl sulfosuccinates, such as the dihexyl-, the dioxtyl- and di-tridecylsodium sulfosuccinates produced by Mona Industries; amidosulfonates, such as sodium N-oleoyl-N-methyltaurate or sodium N-methyl-N-tall oil-acid taurate; sulfoethyl esters of fatty acids which include ring sulfonated alkyl phenol ethoxylates and disulfonated alkyldiphenyl oxide; sulfates of the formula $ROSO_3M^+$ where R and M+ are as previously defined; ethoxylated and sulfated alcohols of the formula $R\text{-}(OCH_2CH_2)_z OSO_3M^+$ where R and M+ are as previously defined and z is an integer greater than or equal to 0, such as sodium tridecyl sulfate; ethoxylated and sulfated alkylphenols of the formula $RC_6H_4(OC_2H_4)_z OSO_3M$ where R, M+ and z are as previously defined; sulfated acids, such as the sulfates of mono- and di-ethanolamines of fatty acids in the $C_{12}$–$C_{15}$ range; sulfated esters, such as those represented by the formula $CH_3(CH_2)_8CH[(OSO_3)Na](CH_2)_6CO_2R$ where R is methyl, ethyl, propyl, butyl or amyl; sulfated oils and fats, such as sulfated oleic acid sold under the name Actrosol SR75 and produced by Southland Corp.; and phosphate esters, such as the salts of mono and diesters of orthophosphoric acid.

Small quantities of water may also be introduced into the neutralization reaction. Typically, water serves as a solvent or diluent for the neutralizing agent or one of the surfactants.

In mixing the ingredients required for this neutralization step any vessel capable of handling the heat of the neutralization reaction is suitable. Typically such vessels are equipped with a water cooled jacket. Low shear, variable speed mixers are recommended. When attempting to neutralize large batches (in excess of 500 gallons) of the polymer slurry, two impellers on a common shaft may be used to provide superior mixing. Insufficient mixing can result in poor stability for the neutralized end product.

The Thickening Agent

The neutralization step results in a thickening agent (commonly called a "concentrate") comprising a mixture of neutralized carboxyl containing polymer and solvent. In aqueous solutions these compositions absorb large quantities of water which causes the copolymer to increase many times in volume. These polymers, because of their swelling properties, are useful as bodying and suspending agents in various mucilaginous and colloidal gel-like applications, such as dentrifices, surfical jellies, creams and ointments, printing paste thickeners and the like.

As stated earlier, the thickening agent produced by the present invention comprises a neutralized salt of a carboxyl-containing polymer in an organic medium. This mixture comprises up to 45 weight percent (and preferably greater than 30 weight percent) of the neutralized salt of the polymer, 20 to 40 weight percent organic solvent, 20 to 30 weight percent water, 1 to 10 weight percent of an anionic surfactant, 0.1 to 5 weight percent of a surfactant having an HLB less than 10, and 0.1 to 5 weight percent of a surfactant having an HLB greater than 10. As used herein, organic medium, organic solvent, and the various surfactants have meanings as previously described in this description.

The thickening agent produced by this invention has viscosities of approximately 5000 centipoise and are unique in that they contain between 35 and 45 weight percent polymer solids (neutralized polymer basis). Prior art neutralization schemes typically produce a thickening agent having only 20 to 35 weight percent polymer solids. The greater polymer content means that less thickening agent is required for a given application to produce the same amount or degree of thickening.

EXAMPLES

In order to illustrate the instant invention the following illustrative examples are provided:

I. Preparation of the Slurry

A polymerization reactor (equipped with a means for mixing and a means for addition of reactants during polymerization) is charged with the following initial ingredients (based on a total reactor charge of 200 parts by weight)

| | | |
|---|---|---|
| Acrylic Acid | 2 | parts |
| Crosslinking Monomer | 0.1 | parts |
| (e.g. trimethylolpropane diallyl ether) | | |
| Surfactant | 1 | part |
| (e.g. Isopropylamine dodecyl benzene sulfonate) | | |
| Mineral Spirits | 91 | parts |
| Polymerization Catalyst | 0.2 | parts |
| (e.g. azobisisobutyronitrile) | | |

The reactor is purged with nitrogen and heated to 136° F. to initiate the polymerization action. After the start of polymerization, the following ingredients are added with mixing to the reactor:

Acrylic Acid 96.1 parts
Crosslinking Monomer 1.8 parts
Surfactant 8 parts

Since the polymerization reaction is highly exothermic, the additional ingredients are added at a rate which will not exceed the heat removal capabilities of the reactor. During this time the temperature of the reactor is slowly raised to 170° F. in order to maintain a steady polymerization rate. Upon completion of polymerization the reactor contents are heated to 200° F. and are maintained at 200° F. for minutes. The reactor contents are then allowed to cool to room temperature. The above procedure is expected to produce a slurry of crosslinked acrylic acid which contains approximately:

50 wt % polymer
45 wt % mineral spirits
5 wt % surfactant

II. Neutralization of the Slurry Using Prior Art Techniques to Produce the Concentrate The slurry produced in Example I is diluted to 40 wt percent polymer solids in the slurry by the addition of mineral spirits and is blended with 2.5 to 10 parts of a surfactant with an HLB less than 10 (e.g. sorbitan monoleate). Next 35 to 40 parts of concentrated ammonium hydroxide are slowly blended to neutralize the acidic slurry. As the neutralization proceeds the batch gets quite viscous and difficult to mix in commercial equipment (>500 gallons). The batch must be cooled to remove the heat of neutralization and keep the ammonia from vaporizing. This is also difficult in commercial equipment because the heat transfer coefficient drops significantly as the batch thickens. Long neutralization times (10-20 hrs) are required in commercial equipment to remove this heat and properly mix the batch. Even with such long times, the product is often quite grainy and lumpy and the reactor is severely fouled with polymer gels. After the slurry is neutralized, an anionic surfactant (sodium lauryl sulfate) and a surfactant with an HLB greater than 10 (polyoxyethylee sorbitan monooleate) are blended in to keep the slurry from settling out in unmixed drums.

This procedure is expected to produce a "concentrate", suitable for use as a thickening agent, containing 25-35 wt % polymer (neutralized basis)
35-45 wt % mineral spirits
20-25 wt % water and unreacted ammonia
5-10 wt % surfactants.

III. Improved Procedure for Neutralization of the Slurry to Produce a High Polymer Solids "Concentrate"

Already neutralized concentrate (100 parts) is pumped into a 4000 gallon kettle equipped with a cooling jacket. The concentrate is acquired from the neutralization procedure described in Example II or is the product of the procedure described in this Example III. An agitator in the kettle is activated and set at 90 rpm. Next a surfactant (1 to 5 parts) is added and 40 to 50 parts concentrated ammonium hydroxide is added to the kettle at a rate as fast as the feed pumps allow. The batch is then allowed to mix for 15 to 20 minutes.

Next, 100 parts of a slurry from Example 1 is transferred to the kettle. The slurry is neutralized by the ammonium hydroxide. The concentrate already in the kettle maintains the viscosity of the batch at a level low enough to insure continued easy mixing. Also the concentrate and cooling jacket "absorb" much of the heat of neutralization and no alarming increase in reactor temperature is observed. After neutralization of the slurry is completed the batch is mixed for 60 minutes and is allowed to cool.

Next an anionic surfactant (5-15 parts), specifically a 30/70 mixture of sodium lauryl sulfate/water, is added to the kettle. This is followed by a surfactant having an HLB greater than 10 (0.5 to 5 parts). The batch is then allowed to continue mixing for 3 hours.

At the end of this procedure, the kettle is expected to contain fully neutralized concentrate comprising approximately 35 to 45 wt % polymer (neutralized basis)
25 to 30 wt % mineral spirits
25 to 30 wt % water and unreacted NH4OH
5 to 10 wt % surfactants.

The foregoing examples of the present invention have been presented for purposes of illustration and description. These descriptions and examples are not intended to be exhaustive or to limit the invention to the precise form disclosed, and obviously many modifications and variations are possible in light of the above disclosure. The examples were chosen and described in order to best explain the principle of the invention and its practical applications to thereby enable others skilled in the art to best utilize the invention in its various embodiments and with various modifications as are suited to the particular use contemplated. It is intended that the subject matter of this invention be limited and defined only by the following claims.

We claim:

1. A process for neutralizing a polymer of an olefinically unsaturated carboxylic acid containing at least one activated carbon-to-carbon double bond and at least one carboxyl group, in order to form the neutralized salt of said polymer which is useful as a thickening agent for aqueous solutions, wherein the process comprises combining with mixing:
   (i) the neutralized salt of a polymer of an olefinically unsaturated carboxylic acid containing at least one activated carbon-to-carbon double bond and at least one carboxyl group, said neutralized salt suspended in a blend of organic solvent and aqueous solvent;
   (ii) a neutralizing agent selected from the group consisting of organic bases and inorganic bases; and (iii) a slurry comprising an unneutralized polymer of an olefinically unsaturated carboxylic acid containing at least one activated carbon-to-carbon double bond and at least one carboxyl group, and at least one organic solvent.

2. The process of claim 1, wherein the process comprises combining with mixing:
(i) at least one surfactant having an HLB less than or equal to 10,
(ii) the neutralized salt of a polymer of an olefinically unsaturated carboxylic acid containing at least one carboxyl group, said neutralized salt suspended in a blend of organic solvent and aqueous solvent,
(iii) a neutralizing agent selected from the group consisting of organic bases and inorganic bases,
(iv) a slurry comprising an unneutralized polymer of an olefinically unsaturated carboxylic acid containing at least one activated carbon-to-carbon double bond and at least one carboxyl group, and at least one organic solvent, and
(v) at least one surfactant having an HLB greater than 10 and at least one nonionic anionic surfactant; wherein ingredients (i) through (v) are combined in the sequence listed.

3. The process of claim 1, wherein the polymer of an olefinically unsaturated carboxylic acid comprises at least one polymerized monomer selected from the group consisting of acrylic acid and methacrylic acid.

4. The process of claim 3, wherein the polymer of an olefinically unsaturated carboxylic acid comprises up to about 5 percent by weight of at least one crosslinking monomer.

5. The process of claim 4, wherein the polymer of an olefinically unsaturated carboxylic acid comprises between 0.1 to about 2.0 percent by weight of at least one crosslinking monomer.

6. The process of claim 5 wherein the crosslinking monomer is selected from the group consisting of trialkyl pentraerythritol, trimethylolpropane triacrylate, 1,6-hexandiol diacrylate, trimethylolpropane diallyl ether, pentaerythritol triacrylate, tetramethylene dimethacrylate, tetramethylene diacrylate, ethylene diacrylate, ethylene dimethacrylate, triethylene glycol dimethacrylate.

7. The process of claim 2, wherein (i), the neutralized salt of the polymer of an olefinically unsaturated carboxylic acid suspended in a blend or organic solvent and aqueous solvent, comprises about 20 to 45 weight percent of the neutralized salt of the polymer, 20 to 40 weight percent of a organic solvent, 20 to 30 weight percent water, 1 to 10 parts by weight of an anionic surfactant, 0.1 to 5 weight percent of a surfactant having an HLB less than 10, and 0.1 to 5 weight percent of a surfactant having an HLB greater than 10.

8. The process of claim 2, wherein the slurry comprising the polymer of an olefinically unsaturated carboxylic acid and the organic solvent, comprises about 50 to 60 weight percent polymer and up to 10 weight percent surfactants.

9. The process of claim 1, wherein the neutralizing agent is selected from the group consisting of hydroxides, ammonia, carbonates, bicarbonates and organic amines.

10. The process of claim 9, wherein the neutralizing agent is at least one hydroxide selected from the group consisting of sodium hydroxide, potassium hydroxide, lithium hydroxide, and ammonium hydroxide.

11. The process of claim 9, wherein the neutralizing agent is at least one carbonate selected from the group consisting of sodium carbonate, potassium carbonate, lithium carbonate, and ammonium carbonate.

12. The process of claim 9, wherein the neutralizing agent is at least one bicarbonate selected from the group consisting of sodium bicarbonate, potassium bicarbonate, lithium bicarbonate and ammonium bicarbonate.

13. The process of claim 9, wherein the neutralizing agent is at least one organic amine selected from the group consisting of ethanolamine, diethanolamine, triethanolamine, diethyl amine, dimethyl amine, trimethyl amine, triethyl amine and tributyl amine.

14. The process of claim 2, wherein the surfactant having an HLB less than or equal to 10 is a surfactant having an HLB between 1.0 and 6.0.

15. The process of claim 14, wherein the surfactant having an HLB less than or equal to 10 is selected from the group consisting of sorbitan monooleate, sorbitan sesquioleate and glycerol monooleate.

16. The process of claim 2, wherein the surfactant having an HLB greater than 10 is selected from the group consisting of polyoxyethylene (20) sorbitan monooleate and nonylphenoxypoly(ethenoxy)ethanol.

17. The process of claim 2, wherein the anionic surfactant is at least one surfactant selected from the group consisting of carboxylate, polyalkoxycarbonates, protein hydrolysates, sulfonates, sulfoethyl esters of fatty acids, sulfates, ethoxylates and sulfated alcohols, ethoxylated and sulfated alkylphenols, sulfated acids, sulfated esters, sulfated oils and fats and phosphate esters.

18. The process of claim 2, wherein each organic solvent is independently selected from the group consisting of benzene, xylene, tetralin, hexane, heptane, cyclohexane, mineral spirits, mineral oils, carbon tetrachloride, chloroform, trichloroethylene, methyl chloride, ethyl chloride, methylene chloride, chlorofluoromethane, chlorofluroethane, methyl acetate, ethyl acetate, butyl propionate, methylethylketone, acetone and dioxane.

19. The process of claim 3, wherein the anionic surfactant is at least one surfactant selected from the group consisting of alkylbenzene sulfonates, alkylarylsulfonates, lignosulfonates, napthalenesulfonates, α-olefinsulfonates, dialkyl sulfosuccinates, and amidosulfonates.

* * * * *

UNITED STATES PATENT AND TRADEMARK OFFICE
CERTIFICATE OF CORRECTION

PATENT NO. : 4,888,367

DATED : Dec. 19, 1989

INVENTOR(S) : Vincent P. Quigley, et al.

It is certified that error appears in the above-identified patent and that said Letters Patent is hereby corrected as shown below:

In Claim 2, item (v), line 1, after "at least one" insert therefor -- nonionic --.

In Claim 2, item (v), line 2, delete "nonionic".

Signed and Sealed this

Fifth Day of March, 1991

*Attest:*

HARRY F. MANBECK, JR.

*Attesting Officer*    *Commissioner of Patents and Trademarks*